US012047375B2

United States Patent
Williams et al.

(10) Patent No.: US 12,047,375 B2
(45) Date of Patent: *Jul. 23, 2024

(54) IDENTITY SECURITY GATEWAY AGENT

(71) Applicant: SailPoint Technologies, Inc., Wilmington, DE (US)

(72) Inventors: Cameron Williams, Denver, CO (US); Ryan Privette, Denver, CO (US); Christopher Chad Wheeler, Denver, CO (US); Andrew John Cer, Highlands Ranch, CO (US); Joseph Nathan Zendle, Centennial, CO (US)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,297

(22) Filed: Feb. 25, 2022

(65) Prior Publication Data
US 2022/0217143 A1 Jul. 7, 2022

Related U.S. Application Data

(63) Continuation of application No. 16/100,056, filed on Aug. 9, 2018, now Pat. No. 11,303,633.
(Continued)

(51) Int. Cl.
*H04L 9/40* (2022.01)
*H04L 12/46* (2006.01)
*H04L 67/025* (2022.01)

(52) U.S. Cl.
CPC ...... *H04L 63/0876* (2013.01); *H04L 12/4641* (2013.01); *H04L 63/0428* (2013.01);
(Continued)

(58) Field of Classification Search
CPC ............ H04L 12/4633; H04L 12/4641; H04L 63/0428; H04L 63/083; H04L 63/0876;
(Continued)

(56) References Cited

U.S. PATENT DOCUMENTS 11,100,209 B2  8/2021  Anjali
11,245,681 B2  2/2022  Roth
(Continued)

OTHER PUBLICATIONS

Jon Brodkin, "The secret to online safety: Lies, random characters, and a password manager", ARS Technica, https://arstechnica.com/information-technology/2013/06/the-secret-to-online-safety-lies-random-characters-and-a-password-manager/ (Jun. 3, 2013) (Year: 2013).*
(Continued)

*Primary Examiner* — Theodore C Parsons
(74) *Attorney, Agent, or Firm* — Sprinkle IP Law Group

(57) ABSTRACT

Systems and methods for network security are provided. Various embodiments of the present technology provide an integrated security platform that combines PAM, CASB, identity access management, and multi-factor authentication onto one platform. This integration allows for a frictionless deployment that can be utilized by companies that may not have large teams of system administrators. As such, some embodiments provide a gateway solution and a proxy solution that is easy to deploy. The user equipment (e.g., computer, phone, point of sale terminal, etc.) can be used as a gateway. An agent can be included on each endpoint that combines gateway functionality of PAM and web rewrite and proxy functionality of a CASB deployment into an endpoint solution.

21 Claims, 13 Drawing Sheets

Related U.S. Application Data

(60) Provisional application No. 62/543,065, filed on Aug. 9, 2017.

(52) U.S. Cl.
CPC ............ H04L 63/083 (2013.01); H04L 63/20 (2013.01); H04L 67/025 (2013.01); *H04L 63/102* (2013.01)

(58) Field of Classification Search
CPC ............... H04L 63/0884; H04L 63/102; H04L 63/1491; H04L 63/20; H04L 67/025
See application file for complete search history.

(56) References Cited

U.S. PATENT DOCUMENTS

| | | |
|---|---|---|
| 11,368,448 B2 | 6/2022 | Privette |
| 11,463,426 B1 | 10/2022 | Wheeler |
| 11,729,169 B2 | 8/2023 | Williams |
| 2002/0049883 A1 | 4/2002 | Schneider |
| 2011/0213965 A1 | 9/2011 | Fu |
| 2014/0351577 A1 | 11/2014 | Vishal |
| 2015/0163222 A1 | 6/2015 | Pal |
| 2015/0229477 A1 | 8/2015 | Blair |
| 2016/0099916 A1 | 4/2016 | Glazemakers |
| 2016/0219060 A1 | 7/2016 | Karunakaran |
| 2022/0086137 A1 | 3/2022 | Privette |
| 2022/0109675 A1 | 4/2022 | Williams |
| 2023/0336549 A1 | 10/2023 | Williams |

OTHER PUBLICATIONS

Office Action for U.S. Appl. No. 17/554,942, mailed Dec. 15, 2022, 12 pgs.
Notice of Allowance for U.S. Appl. No. 16/258,101, mailed May 23, 2022, 11 pgs.
Notice of Allowance for U.S. Appl. No. 17/181,878 mailed Apr. 27, 2022, 5 pgs.
Notice of Allowance issued for U.S. Appl. No. 17/554,942, mailed Apr. 14, 2023, 7 pages.
Office Action for U.S. Appl. No. 18/340,988, mailed Feb. 29, 2024, 14 pgs.

* cited by examiner

IDENTITY SECURITY GATEWAY AGENT

CROSS REFERENCE TO RELATED APPLICATIONS

This application is a continuation of, and claims a benefit of priority under 35 U.S.C. 120 of, U.S. patent application Ser. No. 16/100,056 filed Aug. 9, 2018, entitled "IDENTITY SECURITY GATEWAY AGENT", issued as U.S. Pat. No. 11,303,633, which claims a benefit of priority under 35 U.S.C. 119 to U.S. Provisional Application Ser. No. 62/543,065 filed Aug. 9, 2017, which are hereby incorporated herein for all purposes.

TECHNICAL FIELD

Various embodiments of the present technology generally relate to network security. More specifically, some embodiments of the present technology relate systems and methods for an identity security gateway agent that provides for privileged access management (PAM) and cloud access security broker (CASB).

BACKGROUND

Modern electronic devices such as computers, tablets, mobile phones, wearable devices and the like have become an integral part of modern life. These electronic devices can be connected through various networks and/or network components which allowing for access and sharing of files or data, communications (e.g., e-mails and video conferencing), and the like between the electronic devices. Many users of electronic devices routinely utilize various types of software applications for business and personal activities. Examples of software applications can include word processors, spreadsheet applications, e-mail clients, notetaking software, presentation applications, games, computational software, and others. In many cases, businesses rely heavily on these devices to meet customer needs.

The networks can include a variety of components (e.g., switches, routers, firewalls, repeaters, or other network nodes) which can be arranged to form complicated network topologies that facilitate the exchange of data. Securing the computing and network resources from various threats is important to prevent unauthorized access of data, denial of service attacks, and the like. As such, many businesses have IT departments responsible for deploying, maintaining, and securing the hardware, services, software applications, data, and network components that make up the network infrastructure. For example, network administrators can set in place various security systems and protocols that can include techniques to authorization or denial of access to data or network infrastructure components (hardware or software).

Managing these resources can be difficult and time consuming, especially for smaller businesses that may not have large IT departments. For example, in many cases, these businesses can use a blend of cloud computing resources along with local network components all which have differing security needs and management issues. As such, there are a number of challenges and inefficiencies created in traditional network security systems.

SUMMARY

Systems and methods are described for systems and methods for an identity security gateway agent that provides for privileged access management (PAM) and cloud access security broker (CASB). Some embodiments provide for a network comprising one or more target network components (e.g., cloud-based applications, local network components such as firewalls or routers, etc.), a remote head end, and one or more client devices having a distributed security agent installed on each. In accordance with various embodiments, the remote head end can have one or more vaults having stored therein a plurality of authentication credentials (e.g., usernames and passwords) for target network components. The distributed security agent can be under the control of one or more processors associated with a client device endpoint. In some embodiments, the security agent may act as a shared gateway between for multiple client devices.

In accordance with various embodiments, the security agent can include an identity defined networking component to develop a device profile based on hardware and software configurations. The security agent can also include a virtual private networking component to establish a connection (e.g., a tunnel) between the client device and the remote head end. Once the connection is established, the security agent can transfer, via the connection, an identifier to the remote head end to be validated and used to retrieve an encrypted set of authentication credentials associated with a selected target network component. In some embodiments, the web rewrite module can monitor one or more specific Transmission Control Protocol (TCP) ports to receive the encrypted username and password from the remote head end.

The web rewrite module can automatically inject, upon receiving the encrypted username and password for the selected target network component from the remote head end, the encrypted authentication credentials into a portal to authenticate the user with, and establish a connection with, the selected target network component. The security agent can, upon injecting the encrypted username and password into the portal, cause a memory of the client device to erase the encrypted username and password from with a memory element of the memory. In some embodiments, the security agent can include a plugin affinity and target testing module configured to monitor availability of the security agent and terminate the connection between the client device and the remote head end upon identifying the security agent is unavailable. Some embodiments include a shell remote desktop protocol (RDP) manager to receive connection details from the head end to establish the connection with the selected target network component.

Embodiments of the present invention also include computer-readable storage media containing sets of instructions to cause one or more processors to perform the methods, variations of the methods, and other operations described herein.

Some embodiments provide for a method for operating a distributed security agent on an endpoint device to facilitate connections to target network components. In some embodiments, a connection (e.g., a tunnel) can be established between the endpoint device and a remote head end. A user identifier can be transferred, via the connection, to the remote head end which can use the identifier to retrieve encrypted authentication credentials from a vault in the remote head end. The encrypted authentication credentials are associated with a target network component. The encrypted authentication credentials for the target network component from the remote head end can be automatically injected into a portal (e.g., fields within the portal) to authenticate the user with, and establish a connection with, the target network component. The encrypted authentication credentials can be erased from memory in the endpoint device.

In various embodiments, the distributed security agent can develop a system profile of the endpoint device based on hardware and software configurations of the endpoint device. For example, the system profile is based, at least in part, on one or more of the following device characteristics: media access control (MAC) address, storage configuration, memory configuration, processor configuration, international mobile equipment identity (IMEI) number, international mobile subscriber identity (IMSI) number, media access control (MAC address), operating system (OS) version, or internet protocol (IP) address. In some embodiments, the distributed security agent can monitor one or more specific Transmission Control Protocol (TCP) ports to receive the encrypted authentication credentials from the remote head end.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature

BRIEF DESCRIPTION OF THE DRAWINGS

Embodiments of the present technology will be described and explained through the use of the accompanying drawings in which.

Figure 1:
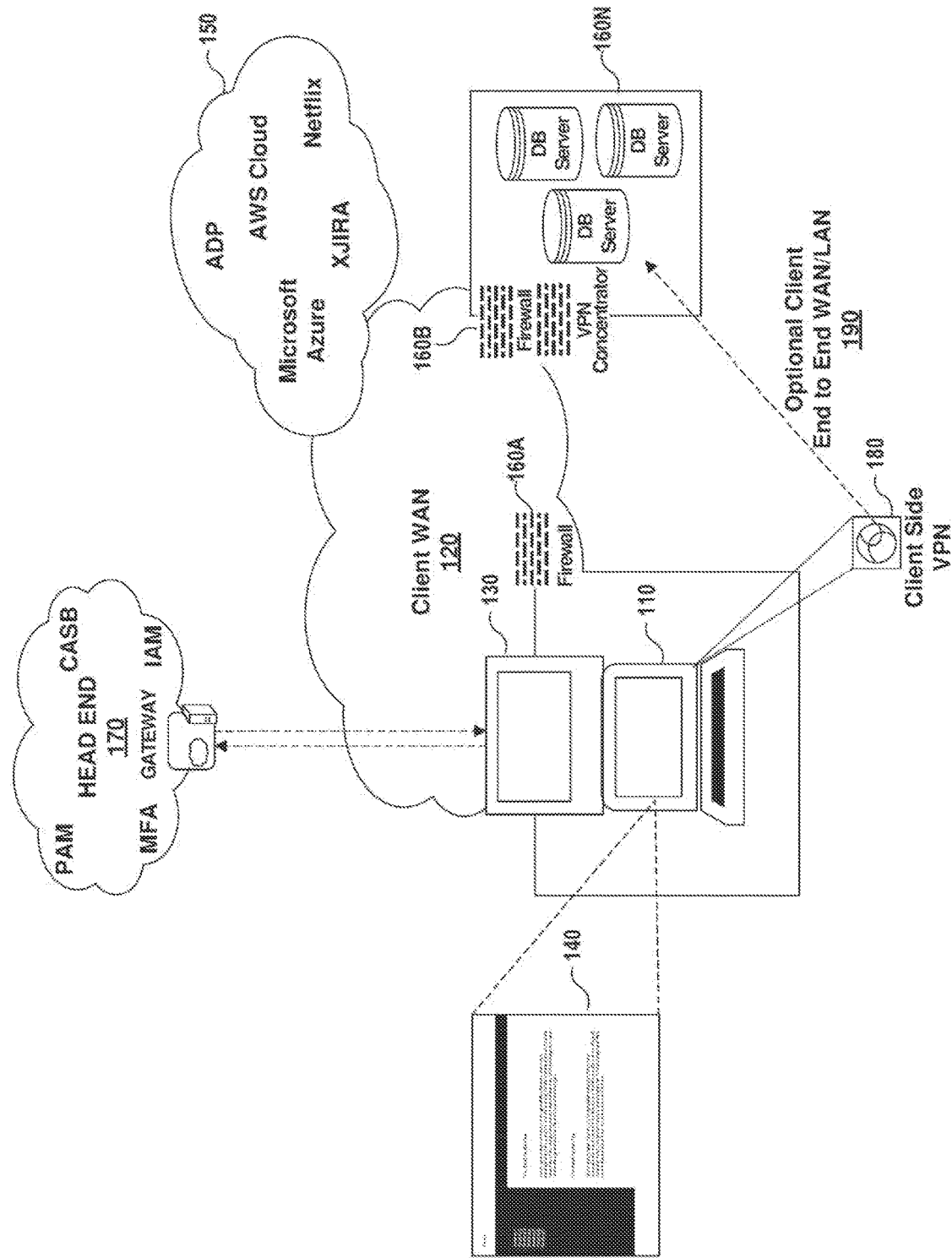
FIG. 1 illustrates an example of an environment 100 which can be used in some embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to network security. More specifically, some embodiments of the present technology relate systems and methods for an identity security gateway agent that provides for privileged access management (PAM) and cloud access security broker (CASB). With the proliferation of modern computing devices, security continues to be a major issue. Attackers try to penetrate networks, obtain privileged account access, interfere with business activities, collect sensitive information and the like. There are a variety of traditional security options that business can deploy. In fact, many businesses often use multiple of these traditional security options, which are often separate solutions that must be independently maintained and can leave gaps in coverage.

One commonly used solution is PAM. PAM is a broker system that allows system administrators and security engineers to connect, in a secure manner, to a target (e.g., client, router, servers, access points, firewalls, databases etc.). Once the system administrator has access to the target device, the system administrator can setup, deploy, access setting, and perform other actions with the target. PAM systems typically retrieve credentials from a vault and post the credential in-line. The broker system for PAM is often implemented as a gateway solution. Many companies often employ PAM as well as CASB. CASB solutions provide a secondary proxy to a web security gateway to sanction access to cloud applications. Unfortunately, these solutions are not holistically combined and must be maintained separately by the users.

In contrast, various embodiments of the present technology provide an integrated security platform that combines PAM, CASB, identity access management, and multi-factor authentication onto one platform. This integration allows for a frictionless deployment that can be utilized by companies that may not have large teams of system administrators. As such, some embodiments provide a gateway solution and a proxy solution that is easy to deploy. The user equipment (e.g., computer, phone, point of sale terminal, etc.) can be used as a gateway. An agent can be included on each endpoint that combines gateway functionality of PAM and web rewrite and proxy functionality of a CASB deployment into an endpoint solution Various embodiments of the present technology provide for a distributive agent that can include one or more of the following features: 1) no listener on any user device; 2) no connectivity required to a centralized appliance; 3) rewriter with PAM for internal web and CASB connection; 4) agents that are identity aware (e.g., tracks HMAC, storage configuration, memory configuration, OS version, etc.) and build an identity profiles for machines; 5) provides status on reachability to target systems; 6) provides connectivity to remote desktop protocol (RDP)/SSH/Web UI/CASB; and/or 7) provides secure capture session replay, key logging, password injection into web based applications, and affinity/awareness of agent and plugin with option to disable access to connections if plugin is not available. Some embodiments can use a dedicated TCP layer 4 socket to provide connectivity through user agent to enterprise environment web user interface via a proxy built into the agent. In various embodiments, an agent host can provide connectivity to target systems by enabling connectivity to devices through client side (or host based) VPN.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an example of an environment 100 which can be used in some embodiments of the present technology. In the embodiments illustrated in FIG. 1, environment 100 can include one or more electronic devices 110 on a client wide area network (WAN) 120, an agent (e.g., running on each electronic device 110), a portal 140, cloud-based applications in a SAAS environment 150, client networking infrastructure 160A-160N (e.g., firewalls, databases, etc.), and a SAAS head end 170. In the embodiments illustrated in FIG. 1, agent 130 installed and running on user device 110 (e.g., laptop, mobile phone, tablet, point of sale device, etc.) can act as a pivot point. The SAAS environment 150 can have target systems listed which the user can select (e.g. via browser or portal 140). In response to receiving a selection of a target system from the user, the agent 130 can communicate with the SAAS head end 170. The actual connection can be established not from the user agent 130, but instead established from the head end 170 and routed back through the user agent 130. This separates the initiation of the connection from the end user machine 110, even though the end user machine 110 is being used as a route path.

In accordance with various embodiments, the agent 130 can automatically connect to the SAAS head end 170 (e.g., using a tunnel or other communication channel that allows private communications over a public network). The agent 130 can create a system ID and transfer that system ID to the SAAS head end 170 to the tunnel, which can validate the ID. In some embodiments, head end 170 can have a vault that stores the username and password for the user. Once the user is validated, access can be granted to retrieve the username and password from the vault.

In some embodiments, the user (e.g., an administrator) can select a PAM or CASB target (e.g., firewall, web application, etc.) from portal 140. Any connection made form portal 140 can send the connection details to agent 130 corresponding to the system ID. The head end 170 can send TCP socket connection information to the agent. When the agent 130 detects a connection response and a user name and password prompt, the agent 130 can inject the credentials from the vault. Upon completion, the credentials can be wiped from memory. While the connection was initiated in head end 170, the connection can be handed back to the browser in various embodiments. In some embodiments, client-side VPN 180 can be used to create an optional client end to end WAN or LAN.

The specific connection details between the portal, head end, and target device may be accomplished using a variety of techniques that may depend on the topology of the network and security agent. For example, the security agent may be a distributed security agent running on each client device 110A-110N or the security agent may be acting as a gateway device.

Figure 2A:
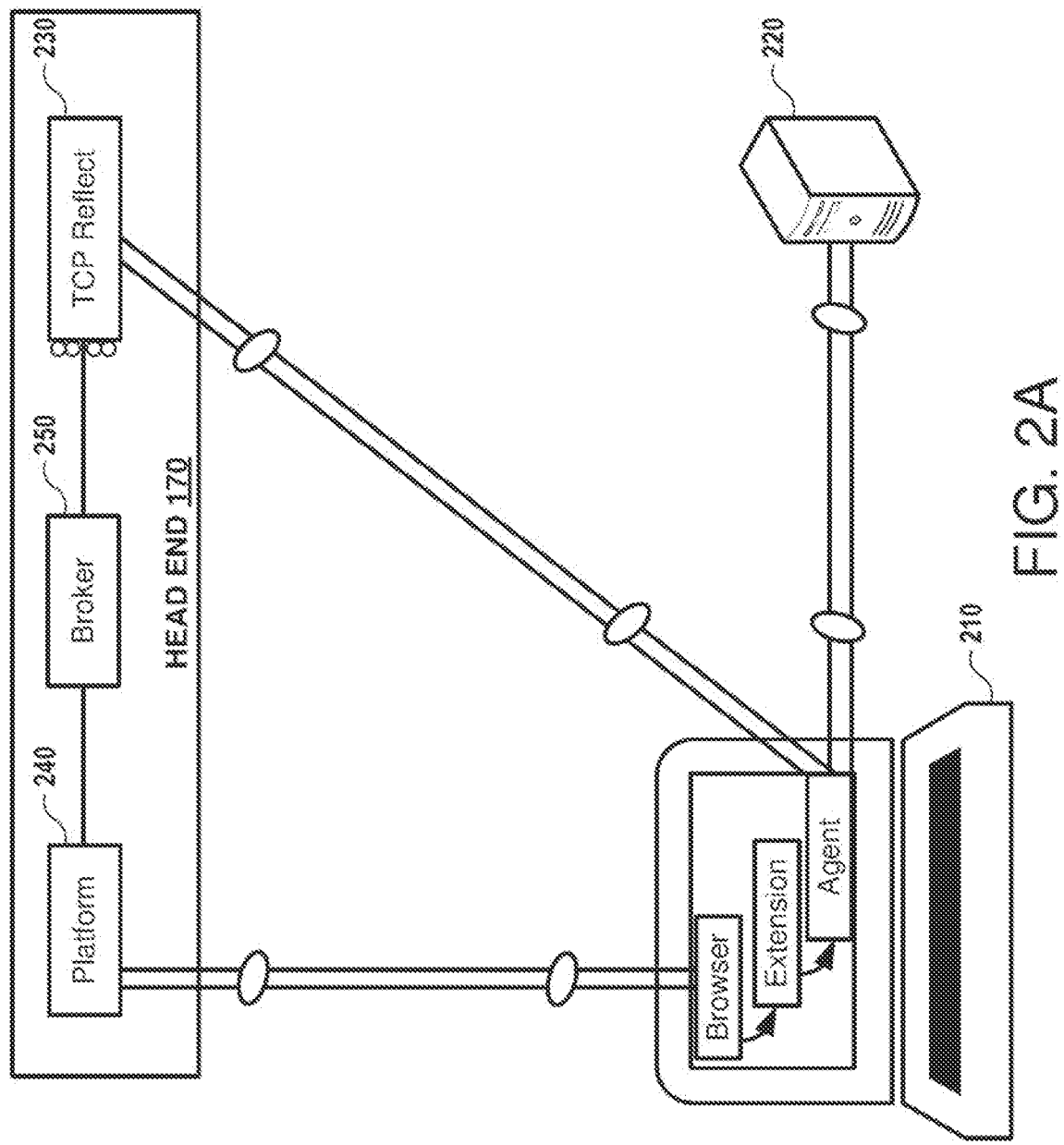
FIG. 2A illustrates a distributed security agent installed on an endpoint device that may be used in one or more embodiments of the present technology.

FIG. 2A illustrates a distributed security agent installed on an endpoint device 210 that may be used in one or more embodiments of the present technology. As illustrated in FIG. 2A, endpoint device 210 have a browser, an extension, and a security agent installed thereon. When a PAM connection is requested by the user, the browser (or portal) can reach out to the browser extension. The extension can then reach out to the agent and request that the agent initiate a TCP path to the target 220. The agent can associate the requested target IP and port to a local "mirror" and reach out to TCP reflect instance (or proxy) 230 at the SAAS head end 170 and request a broker facing listener. The TCP reflect instance 230 can respond to the agent with the IP and port (e.g., 1.1.1.1, port 6001) of the broker facing listener.

The agent informs SAAS head end 170 of the IP and port of the broker facing listener. Note that the agent never requests or has access to credential information as the SAAS broker injects credentials in the embodiments illustrated in FIG. 2A. Broker 240 can then initiate a connection towards the target by initiating a TCP connection to the designated listener TCP reflect instance 230. The TCP reflect instance 230 can then blindly "mirror" the traffic received on the listening port down to the agent. The agent can then blindly "mirror" the traffic received on the TCP socket to a final socket terminating on target 220. At this point there is end-to-end connectivity between the broker 240 and target 220. For every successful connection, the agent pre-emptively creates a new socket to the SAAS TCP reflect instance 230 to handle multiple TCP sessions.

Figure 2B:
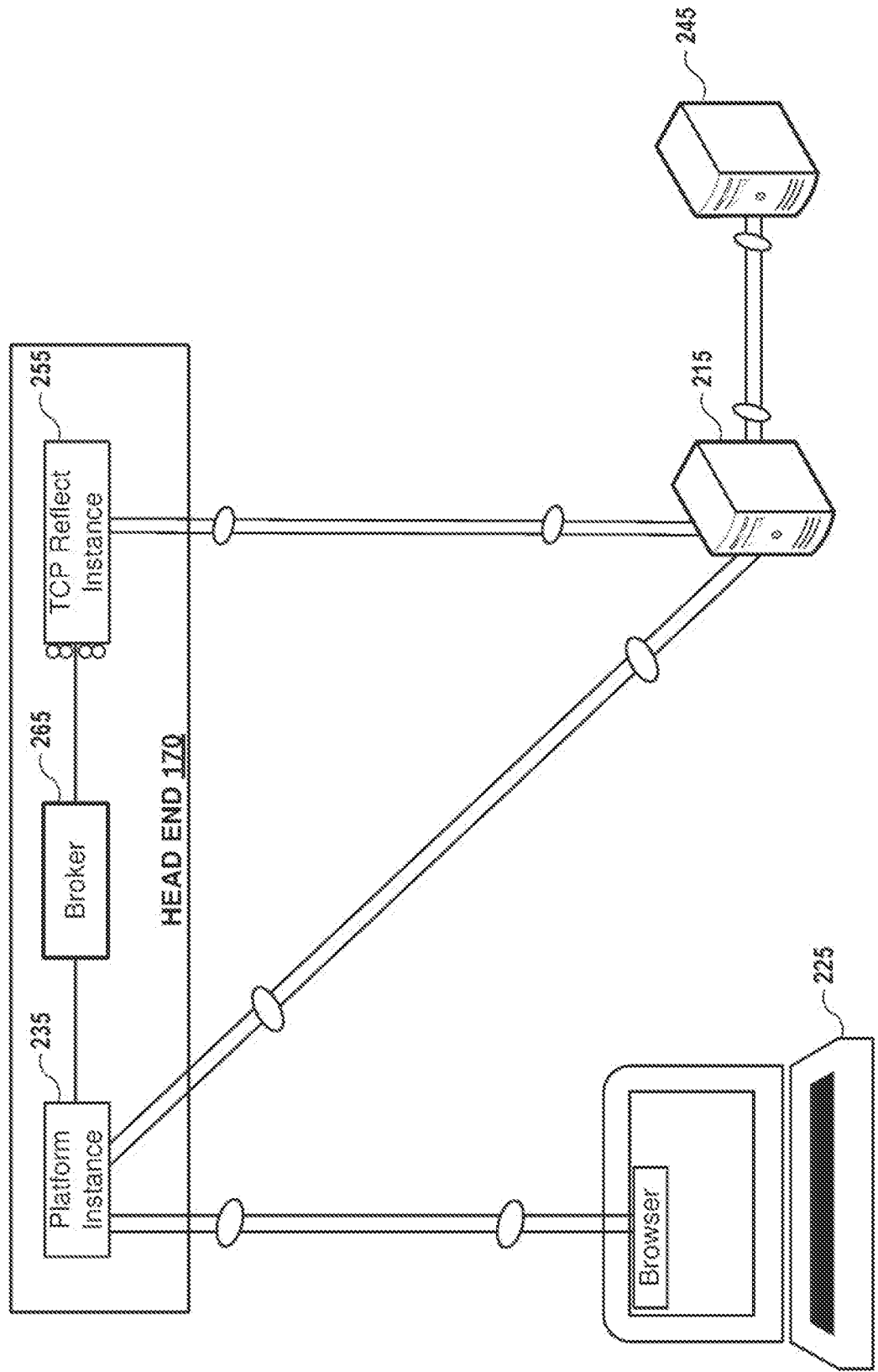
FIG. 2B illustrates a security agent acting as a gateway for multiple endpoint devices in accordance with some embodiments of the present technology.

FIG. 2B illustrates a security agent acting as a gateway for multiple endpoint devices in accordance with some embodiments of the present technology. In the embodiments illustrated in FIG. 2B, multiple users can use one or many shared. centrally located agents 215, which may consist of a single software application in some embodiments. In this scenario, when a PAM connection is requested by the user via the browser/portal on endpoint device 225, the platform instance 235 will reach out to the agent 215 and request that the agent initiates a TCP path to the target 245.

Agent 215 can associate the requested target IP and port to a local "mirror" and reach out to TCP reflect instance 255 at SAAS head end 170 and request a broker facing listener. TCP reflect instance 255 can respond to agent 215 with the IP and port of the broker facing listener. Agent 215 can then inform the SAAS head end 170 of the IP and port of the broker facing listener. Note that agent 215 never requests or has access to credential info as the SAAS broker injects credentials. Broker 265 can initiate a connection towards the target by initiating a TCP connection to the listeners TCP reflect instance 255.

TCP reflect instance 255 can blindly "mirror" the traffic received on the listening port down to agent 215. Agent can then blindly "mirror" the traffic received on the TCP socket to a final socket terminating on target 245. At this point there is end to end connectivity between broker 265 and target 245. For every successful connection, agent 215 can preemptively create a new socket to SAAS TCP reflect instance 255 to handle multiple TCP sessions.

Figure 3:
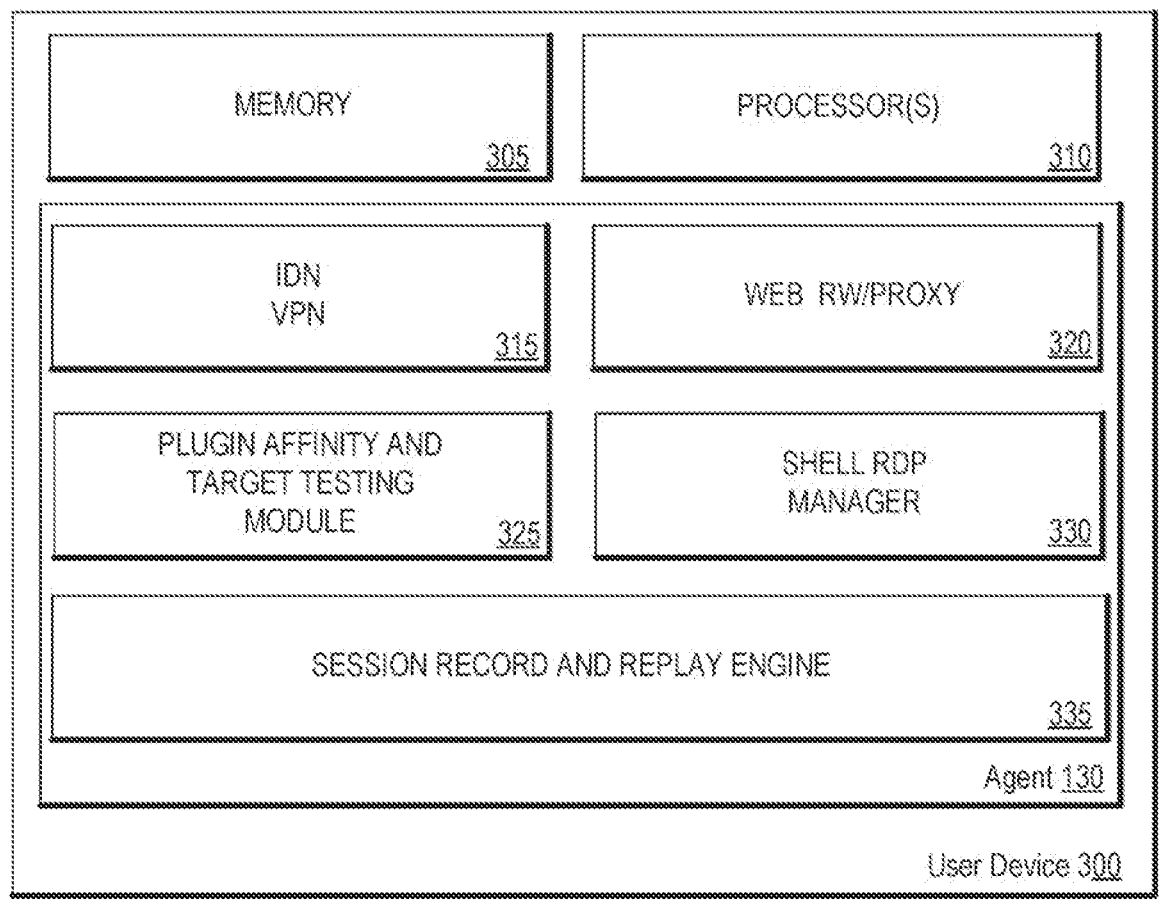
FIG. 3 illustrates a set of components within a user device that may be used in one or more embodiments of the present technology.

FIG. 3 illustrates a set of components within a user device 300 that may be used in one or more embodiments of the present technology. As illustrated in FIG. 3, user device can include memory 305 (e.g., volatile memory and/or nonvolatile memory), processor(s) 310 for executing processing instructions, and an agent. The agent 130 can include IDN/VPN 315, web rewrite/proxy 320, plugin affinity and target testing module 325, shell RDP manager 330, and a session record and replay engine 335. Each of these modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information. In accordance with some embodiments of the present technology, memory 305 can encompass any type of, but is not limited to, volatile memory, nonvolatile memory and dynamic memory. For example, memory 305 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 305 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 305.

Memory 305 may be used to store instructions for running one or more applications or modules on processor(s) 310. For example, memory 305 could be used in one or more embodiments to house all or some of the instructions needed to execute the functionality of IDN/VPN 315, web rewrite/proxy 320, plugin affinity and target testing module 325, shell RDP manager 330, and a session record and replay engine 335. User device 300 may also include an operating system that provides a software package that is capable of managing various hardware resources.

Processor(s) 310 are the main processors of user device 300 used to control the operation of user device 300 which may include various application processors, coprocessors, and other dedicated processors for operating user device 300. The volatile and nonvolatile memories found in various embodiments may include storage media for storing information such as processor-readable instructions, data structures, program modules, or other data. Some examples of information that may be stored include basic input/output systems (BIOS), operating systems, and applications.

IDN/VPN 315 can be an identify defined VPN networking component that can build a tunnel from the endpoint device to the head end (e.g., head end 170 in FIG. 1). In accordance with various embodiments, IDN/VPN 315 can create the tunnel using a variety of tunneling protocols such as, but not limited to, IP in IP (IPIP), SIT/IPv6, Generic Routing Encapsulation (GRE), Secure Socket Tunneling Protocol (SSTP), Internet Protocol Security (IPSec), Layer 2 Tunneling Protocol (L2TP), Virtual Extensible Local Area Network (VXLAN), or the like. In accordance with various embodiments, IDN/VPN 315 can determine the identity of the endpoint device, check for any changes to the hardware and software configurations of the endpoint device, and if no issues are identified then IDN/VPN can initiate a tunnel to the head end. IDN/VPN 315 can then exchange ID's with the head end and the connection is registered.

Web rewrite/proxy 320 can listen for connection details (e.g., login credentials) from specific connections. In some embodiments, web rewrite/proxy 320 monitor specific TCP ports and can inject credentials sent by the head end. Plugin affinity and target testing module 325 can check the availability of the agent. In some embodiments, the confirmation of availability may also include time to live (TTL) and recheck availability upon expiration. If at any point plugin affinity and target testing module 325 cannot validate the agent, then the tunnel created by IDN/VPN 315 can be terminated. Shell RDP manager 330 waits for connection details or information being sent from the head end via the tunnel. In response to receiving the connection details, shell RDP manager 330 initiates connections to shell RDP.

Session record and replay engine 335 can receive record activity information (e.g., snapshots, no activity messages, etc.) received from a plugin within the web portal/browser. For example, in some embodiments the plugin may take screenshots at designated intervals (e.g., 500 ms) and send those snapshots to session record and replay engine 335 which routes that record activity information to the head end.

Figure 4:
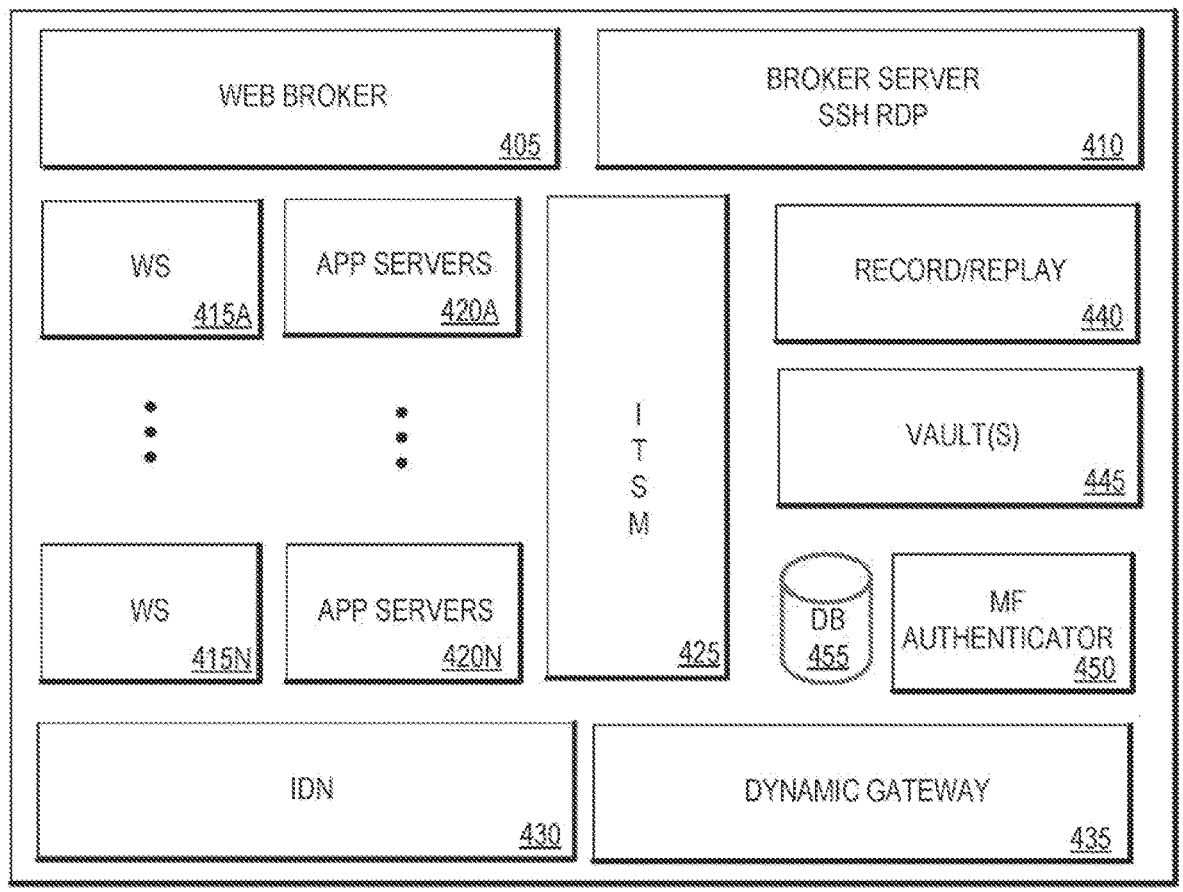
FIG. 4 illustrates a set of components within SAAS head end according to one or more embodiments of the present technology.

FIG. 4 illustrates a set of components within a SAAS head end according to one or more embodiments of the present technology. As illustrated in FIG. 4, the SAAS head end can include web broker 405, broker server/SSH RDP 410, web servers 415A-415N, application servers 420A-420N, information technology security manager (ITSM) 425, IDN 430, dynamic gateway 435, record and replay module 440, vault 445, multi-factor authenticator 450, and database 455. Each of these modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module.

IDN 430 can receive a connection request form an agent. IDN may use a registration component to initial register an endpoint device. IDN 430 can also validate the credentials and device ID from the agent before transferring the connection to dynamic gateway 435.

Web broker 405 and Broker server/SSH RDP 410 can provide load balancing among various web servers 415A-415N. Web servers 415A-415N are font ends for the portal and allows the user of an endpoint device to request a desired target for connecting. Application servers 420A-420N can include a shell remote desktop protocol (RDP) server, a CASB server, a PAM server, etc. ITSM 425 can be an information technology service management mechanism for management of tickets, incidents, changes, and reported problems. Record and replay module 440 can receive the files for the connections and can create a recording of the activity between the various components. The recordings may be processed offline (e.g., by an artificial intelligence engine) to automatically identify various threats, unusual activity, or unwanted activity that may have passed the first line of security defenses. In some embodiments, the recording are also available for review by authorized personnel to review activity performed on the target system to ensure security, as criminal evidence, for learning and assistance of the user, for root cause analysis of a user-caused outage, or any other reason personnel may choose to review activity.

Vault 445 can store the username and passwords for different users and/or different targets (e.g., firewalls, cloud-based applications, etc.). Some embodiments, may use multiple vaults (e.g., one for each username and password) to increase security. Various embodiments of the present technology can use both symmetric and asymmetric keys to encrypt passwords. The asymmetric key can use the RSA algorithm and a key size of 2048, for example, while the symmetric key can use an AES algorithm. Additional techniques used in some embodiments are described in more detail with regard to FIG. 8.

Figure 5:
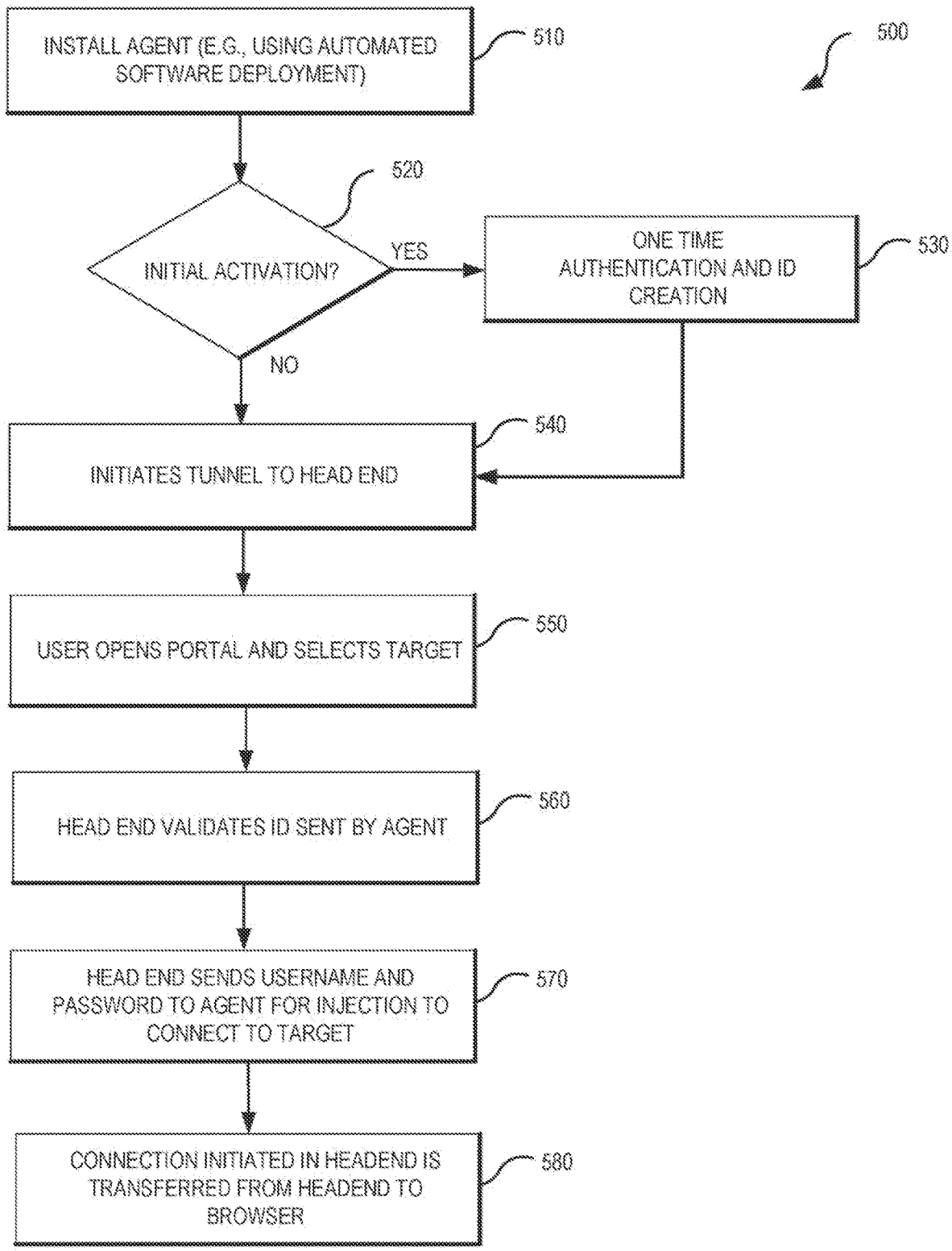
FIG. 5 is a flowchart illustrating an example of a set of operations that may be used to install and operate a distributed security agent and SAAS head end.

Multi-factor authenticator 450 can manage the multifactor authentication process. For example, in some embodiments multiple pieces of evidence (i.e., factors) may be required from the user as part of the authentication process. Multi-factor authenticator 450 request varying pieces of evidences from the user. For example, these factors or pieces of evidence may include something only the user would know (e.g., a knowledge-based authentication factor), something only the user would have (e.g., a possession-based authentication factor), or something only the user is (e.g., an inherence-based authentication factor). Knowledge-based authentication factors can include information such as, but not limited to, passwords, passphrases, personal identification numbers (PINs), answers to secret questions, and the like. Possession-based factors may include factors such as, but not limited to, software tokens, phrases from a passbook, or the like. Inherence-based authentication factors can include, but are not limited to, biometrics (e.g., fingerprints, facial scans, voice, iris, etc.), behavioral biometrics (e.g., keystroke dynamics), or the like FIG. 5 is a flowchart illustrating an example of a set of operations 500 that may be used to install and operate a distributed security agent and SAAS head end. As illustrated in FIG. 5, installation operation 510 installs the agent on one or more endpoint devices. This can be done, for example, using automated software deployment tools that will install ensure the agent is installed on multiple devices within an organization. Once the agent is launched, determination operation 520 can determine whether this activation is the initial activation of the agent. For example, this may be done by identifying a flag, presence or absence of a particular initialization file, etc. When determination operation 520 determines that the current activation is the first time the agent has launched, then determination operation 520 branches to authentication operation 530 where a one-time authentication process and ID creation is performed.

In some embodiments, the ID creation can include building a device identity profile ID. This device identity profile ID can be based on a variety of hardware and software configurations. For example, some embodiments may build a profile based on HMAC, storage configuration, memory configuration, processor configuration, international mobile equipment identity (IMEI) number, international mobile subscriber identity (IMSI) number, media access control (MAC address), operating system (OS) version, IP address, and/or other device characteristics.

When determination operation 520 determines that this is not the first time the agent has launched, or upon completion of authentication operation 530, tunnel operation 540 can be executed. The tunnel can be created from the agent to a destination within the SAAS head end. During target selection operation 550, a user can indicate a selected target (e.g., via a web portal). The target can be cloud-based applications (e.g., CASB target) or internal network components (e.g., a PAM target). In response to this selection, the SAAS head end can use validation operation 560 to validate an ID sent by the agent, retrieve a corresponding username and password from a vault, and send the TCP socket information to the agent. Upon successful validation, injection operation 570 receives the username and password from the head end (e.g., in an encrypted form) and then injects (e.g., using the rewriter from agent 130 shown FIGS. 1 and 2) the username and password to connect to the target. The encrypted username and password can then be wiped from memory of the endpoint device. Transfer operation 580 can then transfer the connection initiated in the head end to the browser opened on the endpoint device.

Figure 6:
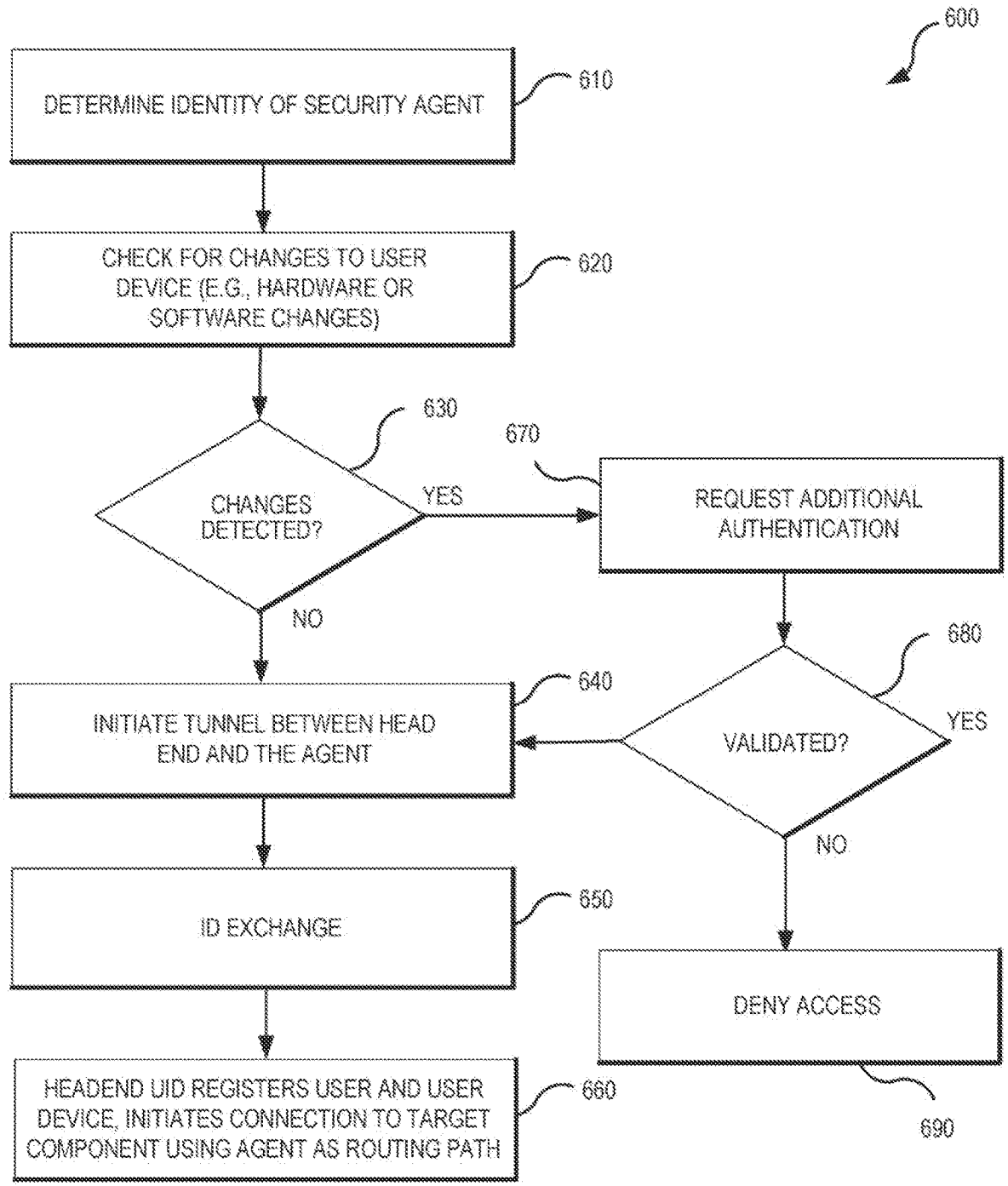
FIG. 6 is a flowchart illustrating an example of a set of operations that may be used for distributed security agent to register with a SAAS head end.

FIG. 6 is a flowchart illustrating an example of a set of operations 600 that may be used to for distributed security agent to register with a SAAS head end. As illustrated in FIG. 6 identity operation 610 can determine the identity of the agent from information sent from the endpoint device. In some embodiments, the information sent form the endpoint device to the SAAS head end may include a unique ID created from unique device characteristics (e.g., hardware and/or software information). The information may be passed as a profile listing a variety of the unique device characteristics as a package of information. In some embodiments, the security agent may create a hash of the information which can be compared directly to a previously stored hash of the information.

Validation operation 620 can determine if there are any changes to the device characteristics. For example, if the amount of memory or operating system are different from the expected amount or version, then validation operation 620 can identify the changes to the endpoint device and generate one or more actions (e.g., monitor, request additional validation, send alerts, etc.) if needed for additional authentication or evaluation. When determination operation 630 determines that no changes (or only minimal changes) are present, determination operation 630 can branch to initiation operation 640 that can initiate a tunnel to the head end from the endpoint device. The tunnel allows exchange operation 645 to exchange ID information with the head end to validate the user and retrieve stored password and usernames. Registration operation 650 can then validate and register the device, initiate a connection to a target component before allowing access to the various services.

When determination operation 630 determines that changes (or significant) changes have occurred, then determination operation 630 branches to additional authentication operation 670. For example, the user may be asked for additional verification information (e.g., usernames and passwords, PINs, biometrics, etc.), to connect the endpoint device from a physical network that is trusted (potentially at a specific time), or other verification information such as one-time tokens, two-party authentication, etc. Validation operation 680 can validate the additional information. When validation operation 680 successfully validates the user and user device, validation operation 680 can branch to inhiation operation 640. An updated profile can be created and sent to the head end as part of exchange operation 650. When validation operation 680 fails to successfully validate, then validation operation 680 branches to denial operation 690 where access to the head end is denied.

Figure 7:
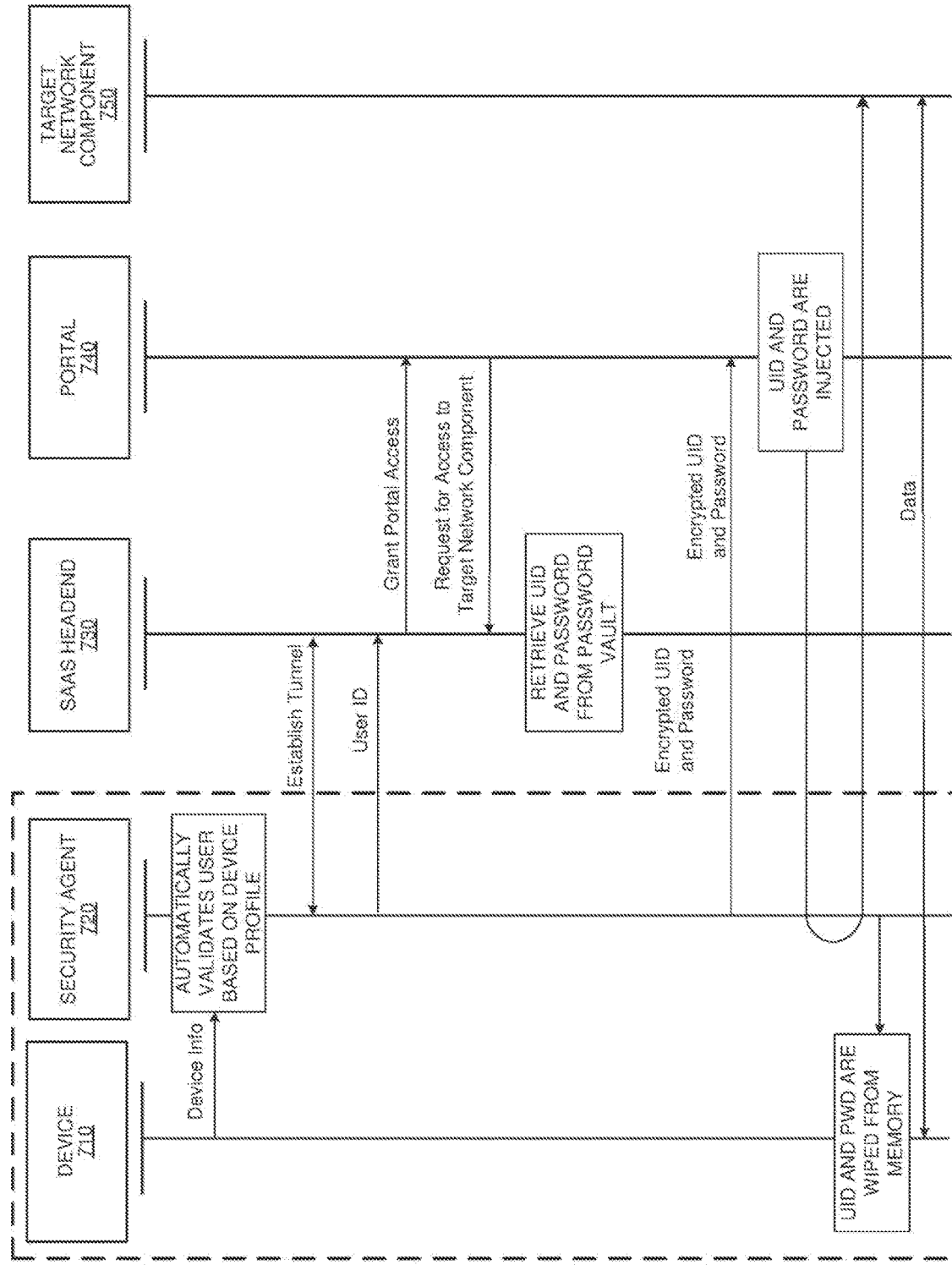
FIG. 7 is a sequence diagram illustrating an example of communications between components that may be used in various embodiments of the present technology.

FIG. 7 is a sequence diagram illustrating an example of communications between components that may be used in various embodiments of the present technology. As illustrated in FIG. 7, device 710 can have an installed security agent 720. When the device is activated or powered on, security agent 720 can collect device information and validate the device based on the device identity profile. In some embodiments, the ID creation can include building a device identity profile based on a variety of hardware and software configurations. For example, some embodiments may build a profile based on HMAC, storage configuration, memory configuration, processor configuration, international mobile equipment identity (IMEI) number, international mobile subscriber identity (IMSI) number, media access control (MAC address), operating system (OS) version, IP address, and/or other device characteristics.

Upon validation, security agent 720, can establish a tunnel from the agent to a destination (e.g., a destination gateway) within the SAAS head end 730. Using the tunnel, security agent 720 can transmit a user ID which can be validated by head end 730 and access to portal 740 can be granted. The portal information can be populated with available target components (e.g., software or hardware). The user can select a desired target component and a request for access can be sent to head end 730. For example, the target can be cloud-based applications (e.g., CASB target) or internal network components (e.g., a PAM target).

The user ID (UID) and password for the target component can be retrieved from a password vault. The UID and password may be encrypted when retrieved and passed to security agent 720. Security agent 720 can then inject (e.g., using the rewriter from agent 130 shown FIGS. 1 and 2) the username and password into portal 740 to connect to the target 750. In some embodiments, security agent 720 can request device 710 wipe the encrypted username and password from memory. The connection initiated in the head end (and routed via the security agent) to the browser opened on the endpoint device can be transferred to the device allowing for a secure exchange of data.

Figure 8:
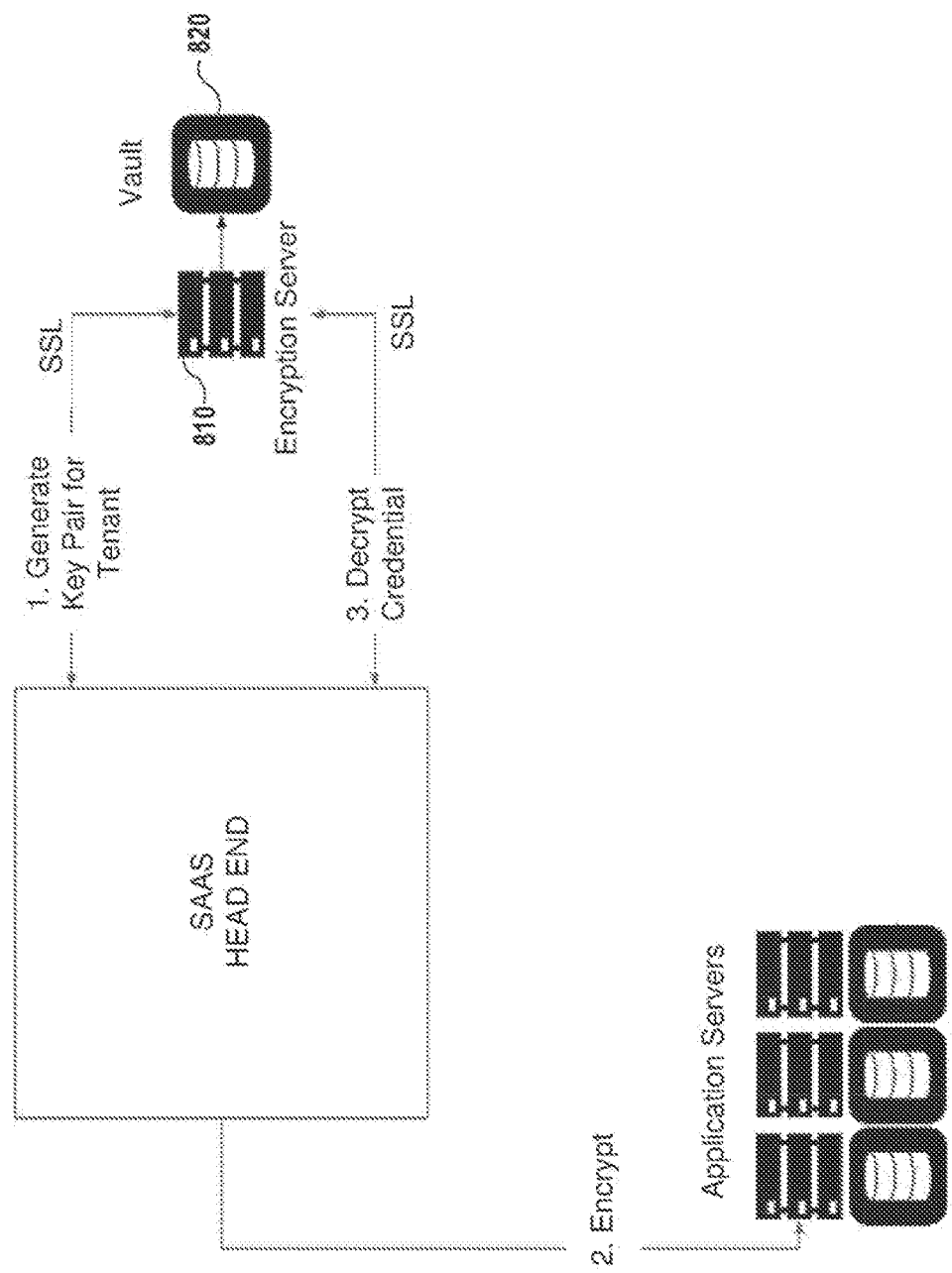
FIG. 8 illustrates an example of tenant encryption that may be used in some embodiments of the present technology.

FIG. 8 illustrates an example of tenant encryption that may be used in some embodiments of the present technology. As illustrated in FIG. 8, a request (1) can be made to create a tenant schema. Public/private asymmetric key pairs can be created by encryption server 810. The generated private key can be encrypted with a secrete key value retrieved from the provider. The provider will return a secret key object which can contain a unique identifier and a secret key. The secret key can be created based upon a password retrieved from the provider. When the secret key is generated for the encryption of a private key, the secret key can be stored using the secret key storage provider. The unique identifier and the encrypted private key can be inserted into the vault 820. In some embodiments, the service can return a key vault ID associated with the insertion of the private key into the key vault and the public key generated.

When a credential is added or updated by a user or created by the system, the credential password is encrypted (2) with a system generated secure random symmetric key. The symmetric key can then be encrypted with the public key value retrieved from encryption server 810.

To decrypt the credential, a call (3) can be made to the key vault decrypt service. The decrypt service can pass one or more of the following items: 1) encrypted credential (e.g., encrypted by randomly generated symmetric key), 2) an encrypted symmetric key (e.g., encrypted with a public key associated to the tenant), and/or 3) key vault ID associated to tenant public key. The encryption server decrypt service can then return back a decrypted credential.

Figure 9:
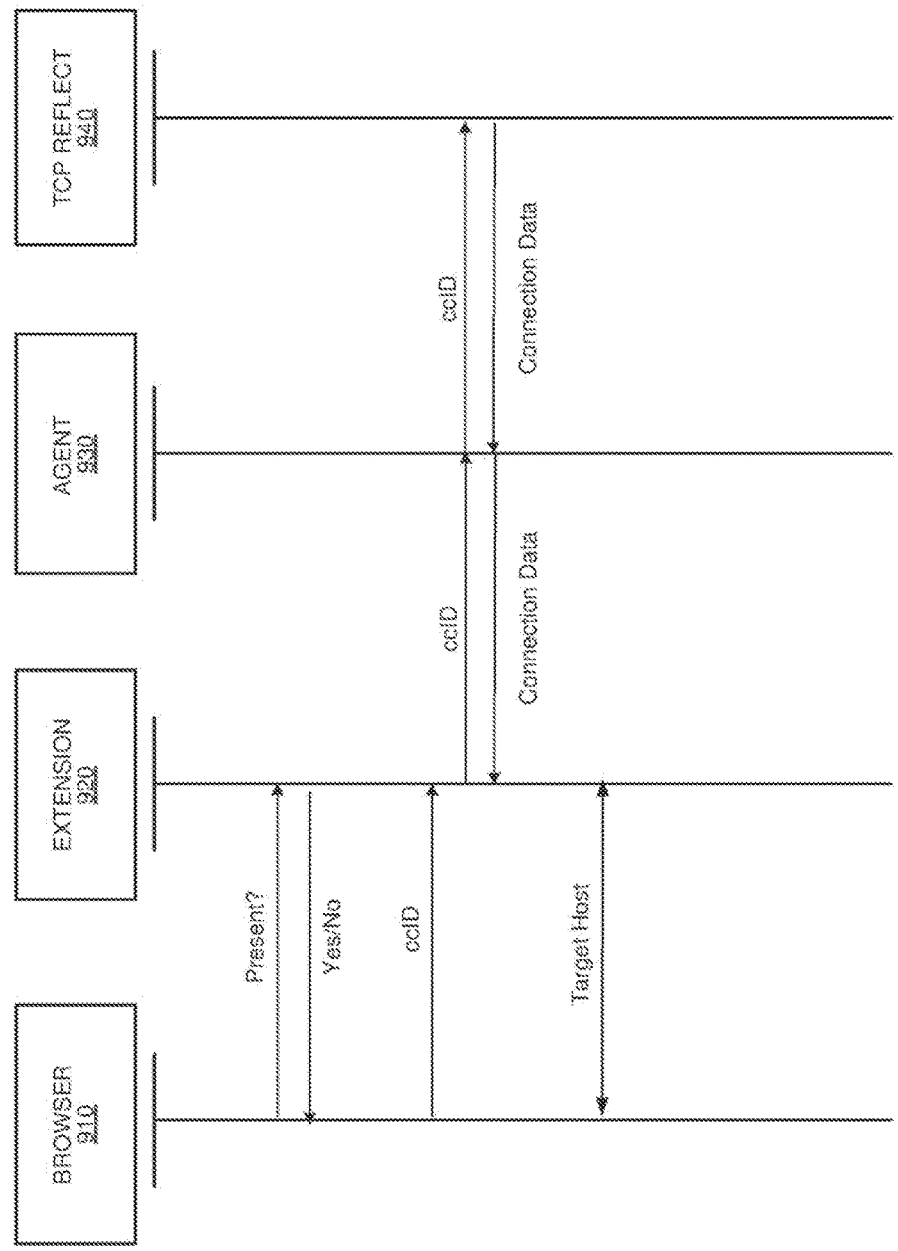
FIG. 9 is a sequence diagram illustrating an example set of communications between various components of a system with a distributed security agent making a PAM connection in accordance with one or more embodiments of the present technology.

FIG. 9 is a sequence diagram illustrating an example set of communications between various components of a system with a distributed security agent making a PAM connection in accordance with one or more embodiments of the present technology. In the embodiments illustrated in FIG. 9, a PAM request with an agent on a user's computer is made. In this example, a single user will use one locally installed agent 930 which consists of a software application and browser extension 920. When a PAM connection is requested by the user, browser/portal 910 will reach out to browser extension 920 to verify presence of the extension. The request will either time out or an acknowledgement will be received by the browser.

When the extension and agent are present, browser 910 can pass a connection ID (ccID) to extension 920. The ccID, in some embodiments, may include connection details such as IP address and port of the target host. Agent 930 can then associate the requested target IP and port to a local "mirror" and will reach out to TCP reflect 940 at the SAAS headend and request a broker facing listener. TCP reflect can respond to agent 930 with connection data. The connection data can include the TCP reflect details such as the IP and port of the listener. While not shown in FIG. 9, agent 930 can inform a SAAS headend of the connection data which can then inject credentials and initiate a connection toward the target device by initiating a TCP connection to the listeners of TCP reflect 940. The TCP reflect 940 can then "mirrors" the traffic received on the listening port down to agent 930 which can mirror the traffic received on the TCP socket to a final socket terminating on the target. At this point, there is end to end connectivity to the target.

Figure 10:
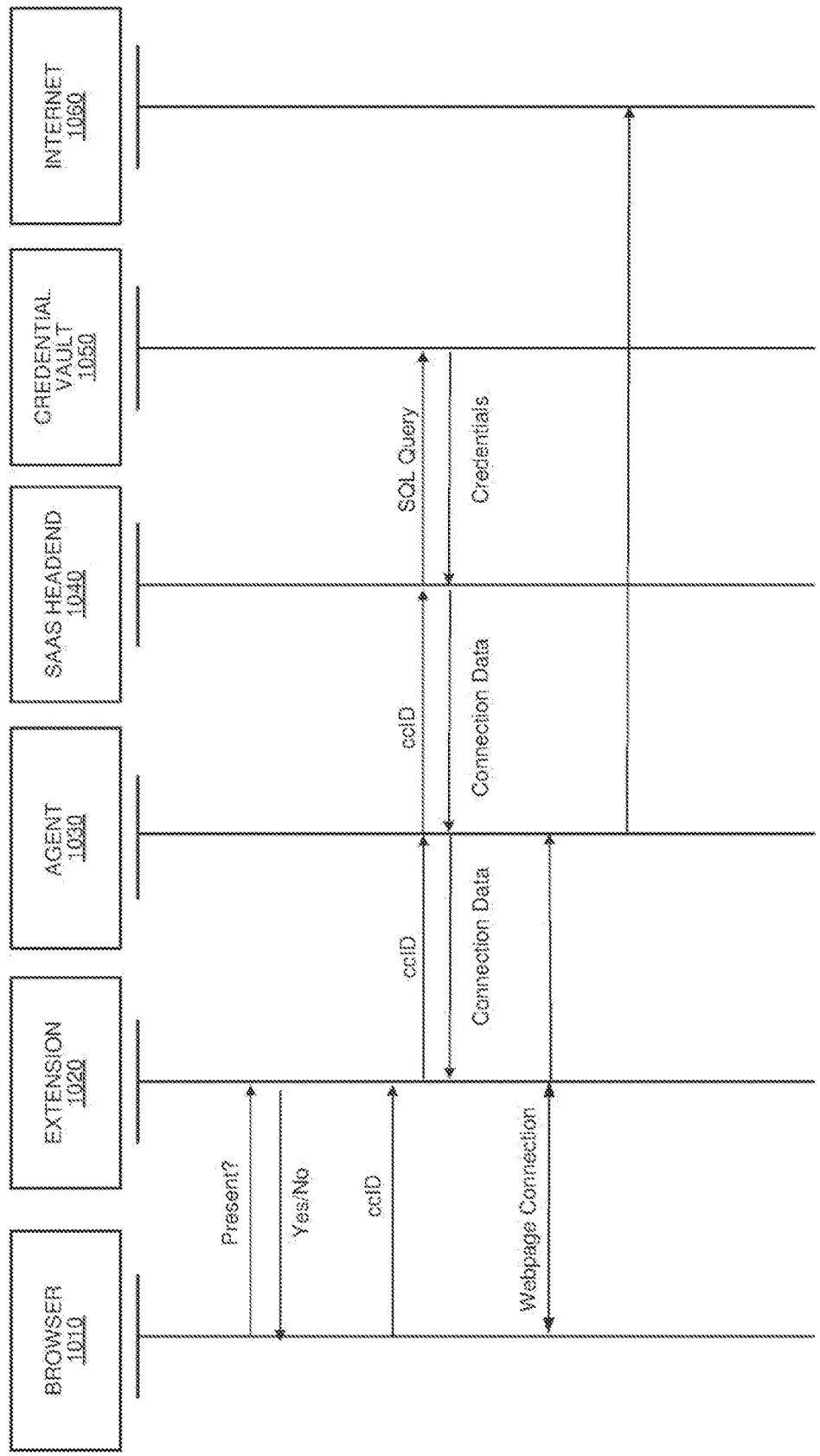
FIG. 10 is a sequence diagram illustrating an example set of communications between various components of a system with a distributed security agent make a CASB/WEB UI connection in accordance with some embodiments of the present technology.

FIG. 10 is a sequence diagram illustrating an example set of communications between various components of a system with a distributed security agent making a CASB/WEB UI connection in accordance with some embodiments of the present technology. In embodiments illustrated in FIG. 10, a single user can use one locally installed browser extension and one agent which may be installed on the local system or a shared, central location. Prior to any connection attempt, the local system is configured to proxy all relevant/configured web connections to a local or shared gateway agent. The agent can include a web re-write engine capable of editing a web request in real-time to replace decoy credentials with valid, secured user credentials.

When a CASB/WEBUI connection is requested by the user, the browser sends 1010 a request to the extension to check if the extension 1020 is present. If not present, the user is prompted to install the extension. If present, the browser 1010 will send another request to the extension 1020 with the ccID. The extension will reach out to the agent and request abstracted, single-use, decoy credentials. The agent will reach out to the SAAS headend 1040 and request valid credentials for the user which will gain entry to the target server. The SaaS headend 1040 retrieves these credentials from the Credential Vault 1050. The SaaS headend 1040 then responds with the Connection Data to the agent 1030. The agent 1030 stores the valid credentials in memory along with single-use, decoy credentials. There is a 1-to-1 relationship between a decoy credential and a valid credential. The agent 1030 responds to the extension request from with the decoy credentials and connection meta data.

The extension intercepts the CASB/WEBUI HTTP/HTTPS Web Connection and injects the decoy credentials into the session. Note, these are the only credentials exposed to the user on the local system and may be visible by a password manager or browser plugin. As the web session is proxied through the agent, the agent replaces the decoy credentials with valid credentials and forwards to the target web server (Internet). Post connection management of credentials can include the agent deleting the valid credentials from memory and moves the decoy credentials to an in memory store of expired, recently used decoys. These serve as a "honeypot" or trap for a bad actor who may attempt to observe and re-use credentials. If expired, decoy credentials can be observed in subsequent connections, an alarm is generated and sent to a central system.

As the web session continues, the extension periodically (e.g., several times per second) captures screenshots and key logs. Key logs can be sent to the SAAS headend and stored securely, and screenshots can be sent to the SAAS headend and queued for rendering into a viewable video session.

Figure 11:
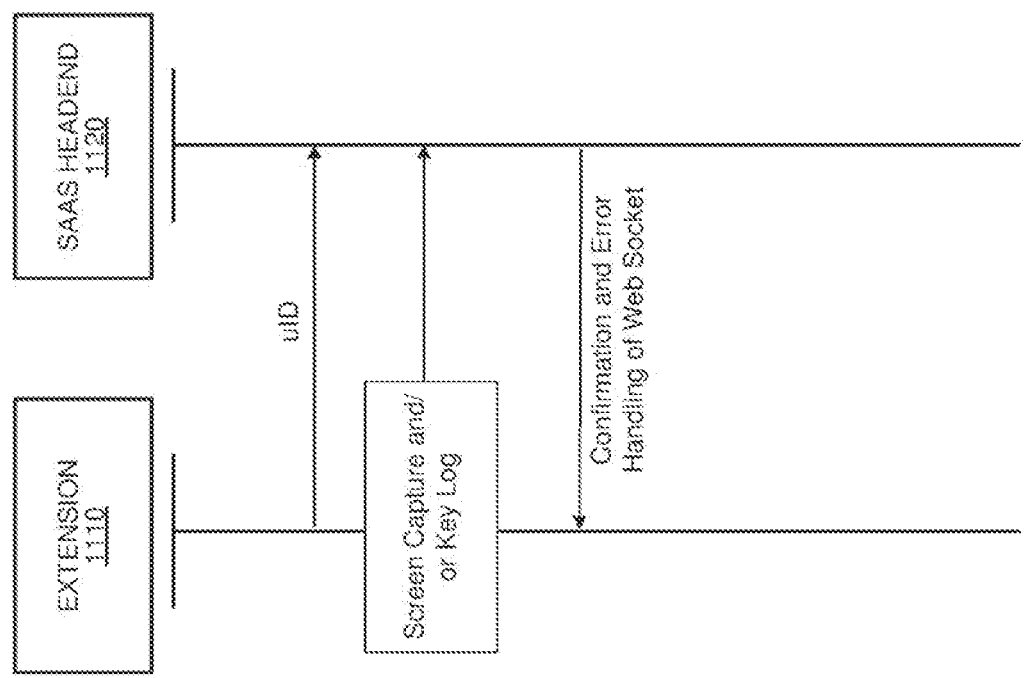
FIG. 11 is a sequence diagram illustrating an example set of communications between various components of a system with a CASB/WEB UI setup and decoy credential process in accordance with one or more embodiments of the present technology.

FIG. 11 is a sequence diagram illustrating an example set of communications between various components of a system with a CASB/WEB UI setup and decoy credential process in accordance with one or more embodiments of the present technology. As illustrated in FIG. 11, a user ID is sent to the SAAS head end 1120. As the extension captures the screen and/or logs the keystrokes, the information can be passed to SAAS headend 1120. SAAS head end 1120 can send back to extension 1110, confirmations and error handling information for the web socket.

Exemplary Computer System Overview

Aspects and implementations of the imaging system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 12:
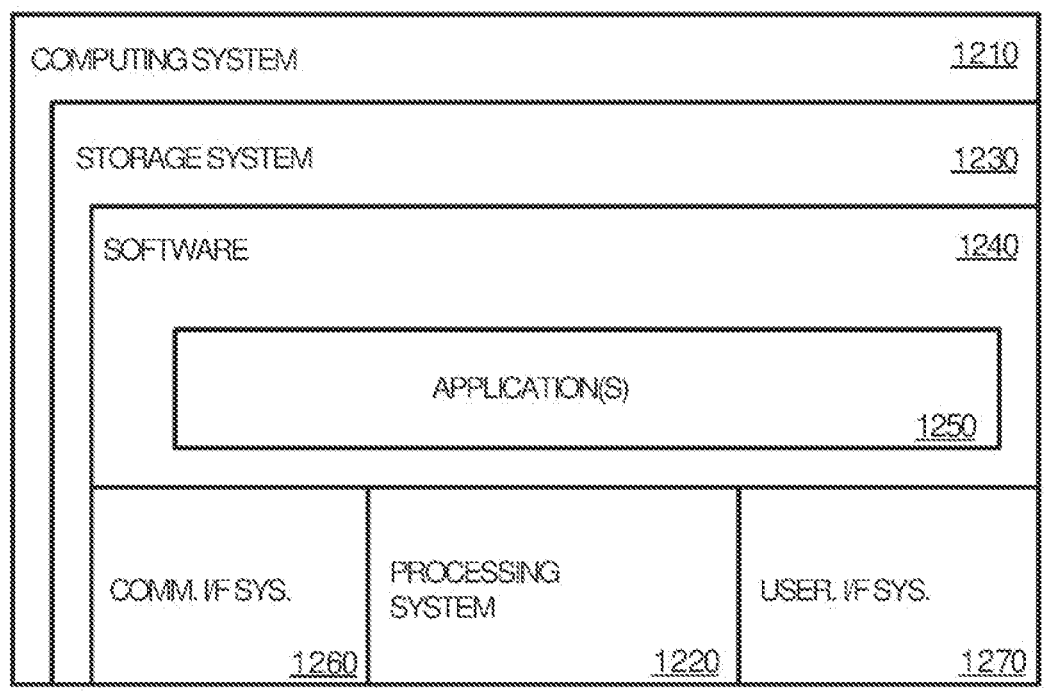
FIG. 12 is an example of a computer system that may be used in some embodiments of the present technology.

FIG. 12 illustrates computing system 1210, which is representative of any system or collection of systems in which the various applications, services, scenarios, and processes disclosed herein may be implemented. For example, computing system 1210 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 1210 may be implemented as a single apparatus, system, or device or may be implemented in a distributed manner as multiple apparatuses, systems, or devices. Computing system 1210 includes, but is not limited to, processing system 1220, storage system 1230, software 1240, applications 1250, communication interface system 1260, and user interface system 1270. Processing system 1220 is operatively coupled with storage system 1230, communication interface system 1260, and an optional user interface system 1270.

Processing system 1220 loads and executes software 1240 from storage system 1230. When executed by processing system 1220 for deployment of scope-based certificates in multi-tenant cloud-based content and collaboration environments, software 1240 directs processing system 1220 to operate as described herein for at least the various processes, operational scenarios, and sequences discussed in the foregoing implementations. Computing system 1210 may optionally include additional devices, features, or functionality not discussed for purposes of brevity.

Referring still to FIG. 12, processing system 1220 may comprise a micro-processor and other circuitry that retrieves and executes software 1240 from storage system 1230. Processing system 1220 may be implemented within a single processing device, but may also be distributed across multiple processing devices or sub-systems that cooperate in executing program instructions. Examples of processing system 1220 include general purpose central processing units, application specific processors, and logic devices, as well as any other type of processing device, combinations, or variations thereof.

Storage system 1230 may comprise any computer readable storage media readable by processing system 1220 and capable of storing software 1240. Storage system 1230 may include volatile and nonvolatile, removable and non-removable media implemented in any method or technology for storage of information, such as computer readable instructions, data structures, program modules, or other data. Examples of storage media include random access memory, read only memory, magnetic disks, nonvolatile memory, battery backed memory, Non-Volatile DIMM memory, phase change memory, memristor memory, optical disks, flash memory, virtual memory and non-virtual memory, magnetic cassettes, magnetic tape, magnetic disk storage or other magnetic storage devices, or any other suitable storage media.

In addition to computer readable storage media, in some implementations storage system 1230 may also include computer readable communication media over which at least some of software 1240 may be communicated internally or externally. Storage system 1230 may be implemented as a single storage device, but may also be implemented across multiple storage devices or sub-systems co-located or distributed relative to each other. Storage system 1230 may comprise additional elements, such as a controller, capable of communicating with processing system 1220 or possibly other systems.

Software 1240 may be implemented in program instructions and among other functions may, when executed by processing system 1220, direct processing system 1220 to operate as described with respect to the various operational scenarios, sequences, and processes illustrated herein. For example, software 1240 may include program instructions for directing the system to perform the processes described above.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1240 may include additional processes, programs, or components, such as operating system software, virtual machine software, or application software. Software 1240 may also comprise firmware or some other form of machine-readable processing instructions executable by processing system 1220.

In general, software 1240 may, when loaded into processing system 1220 and executed, transform a suitable apparatus, system, or device (of which computing system 1210 is representative) overall from a general-purpose computing system into a special-purpose computing system. Indeed, encoding software on storage system 1230 may transform the physical structure of storage system 1230. The specific transformation of the physical structure may depend on various factors in different implementations of this description. Examples of such factors may include, but are not limited to, the technology used to implement the storage media of storage system 1230 and whether the computer-storage media are characterized as primary or secondary storage, as well as other factors.

For example, if the computer readable storage media are implemented as semiconductor-based memory, software 1240 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1260 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 1270 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 1270. In some cases, the input and output devices may be combined in a single device, such as a display capable of displaying images and receiving touch gestures. The aforementioned user input and output devices are well known in the art and need not be discussed at length here. In some cases, the user interface system 1270 may be omitted when the computing system 1210 is implemented as one or more server computers such as, for example, blade servers, rack servers, or any other type of computing server system (or collection thereof).

User interface system 1270 may also include associated user interface software executable by processing system 1220 in support of the various user input and output devices discussed above. Separately or in conjunction with each other and other hardware and software elements, the user interface software and user interface devices may support a graphical user interface, a natural user interface, an artificial intelligence (AI) enhanced user interface that may include a virtual assistant or bot (for example), or any other type of user interface, in which a user interface to an imaging application may be presented.

Communication between computing system 1210 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system, comprising:
a processor; and
a non-transitory computer readable medium, comprising instructions for:
establishing, by a security agent, a connection between an endpoint device and a remote head end, the connection including a secure tunnel;
transferring, via the connection between the endpoint device and the remote head end established by the security agent, a user identifier from the endpoint device to the remote head end to be used to retrieve encrypted authentication credentials from the remote head end, wherein the encrypted authentication credentials are associated with a target network component; and
in response to receiving the encrypted authentication credentials for the target network component from the remote head end at the endpoint device, automatically injecting at the endpoint device, the encrypted authentication credentials into a portal open at the endpoint device to authenticate and establish a connection with the target network component.

2. The system of claim 1, wherein the target network component is cloud based.

3. The system of claim 1, further comprising developing a system profile of the endpoint device.

4. The system of claim 3, wherein the system profile is based, at least in part, on network attributes of the endpoint device.

5. The system of claim 1, wherein the instructions are further for monitoring one or more specific ports to receive the encrypted authentication credentials from the remote head end.

6. The system of claim 1, further comprising erasing the encrypted authentication credentials from a memory in the endpoint device.

7. The system of claim 1, further comprising handing the connection to a web browser running on the endpoint device.

8. A method for operating a distributed security agent on an endpoint device to facilitate connections to target network components, the method comprising:
establishing, by a security agent, a connection between an endpoint device and a remote head end, the connection including a secure tunnel;
transferring, via the connection between the endpoint device and the remote head end established by the security agent, a user identifier from the endpoint device to the remote head end to be used to retrieve encrypted authentication credentials from the remote head end, wherein the encrypted authentication credentials are associated with a target network component; and
in response to receiving the encrypted authentication credentials for the target network component from the remote head end at the endpoint device, automatically injecting at the endpoint device, the encrypted authentication credentials into a portal open at the endpoint device to authenticate and establish a connection with the target network component.

9. The method of claim 8, wherein the target network component is cloud based.

10. The method of claim 8, further comprising developing a system profile of the endpoint device.

11. The method of claim 10, wherein the system profile is based, at least in part, on network attributes of the endpoint device.

12. The method of claim 8, further comprising monitoring one or more specific ports to receive the encrypted authentication credentials from the remote head end.

13. The method of claim 8, further comprising erasing the encrypted authentication credentials from a memory in the endpoint device.

14. The method of claim 8, further comprising handing the connection to a web browser running on the endpoint device.

15. A non-transitory computer-readable storage medium, comprising instructions for:
   establishing, by a security agent, a connection between an endpoint device and a remote head end, the connection including a secure tunnel;
   transferring, via the connection between the endpoint device and the remote head end established by the security agent, a user identifier from the endpoint device to the remote head end to be used to retrieve encrypted authentication credentials from the remote head end, wherein the encrypted authentication credentials are associated with a target network component; and
   in response to receiving the encrypted authentication credentials for the target network component from the remote head end at the endpoint device, automatically injecting at the endpoint device, the encrypted authentication credentials into a portal open at the endpoint device to authenticate and establish a connection with the target network component.

16. The non-transitory computer-readable storage medium of claim 15, wherein the target network component is cloud based.

17. The non-transitory computer-readable storage medium of claim 15, further comprising developing a system profile of the endpoint device.

18. The non-transitory computer-readable storage medium of claim 17, wherein the system profile is based, at least in part, on network attributes of the endpoint device.

19. The non-transitory computer-readable storage medium of claim 15, further comprising instructions for monitoring one or more specific ports to receive the encrypted authentication credentials from the remote head end.

20. The non-transitory computer-readable storage medium of claim 15, further comprising erasing the encrypted authentication credentials from a memory in the endpoint device.

21. The non-transitory computer-readable storage medium of claim 15, further comprising handing the connection to a web browser running on the endpoint device.

* * * * *